United States Patent
Asano et al.

(10) Patent No.: US 11,262,319 B2
(45) Date of Patent: Mar. 1, 2022

(54) MEASURING X-RAY CT APPARATUS AND PRODUCTION WORK PIECE MEASUREMENT METHOD

(71) Applicant: MITUTOYO CORPORATION, Kanagawa (JP)

(72) Inventors: Hidemitsu Asano, Kanagawa (JP); Masato Kon, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 106 days.

(21) Appl. No.: 16/291,699

(22) Filed: Mar. 4, 2019

(65) Prior Publication Data
US 2019/0277780 A1    Sep. 12, 2019

(30) Foreign Application Priority Data
Mar. 12, 2018   (JP) .............................. JP2018-044787

(51) Int. Cl.
*G06K 9/00*     (2006.01)
*G01N 23/083*   (2018.01)
(Continued)

(52) U.S. Cl.
CPC ......... *G01N 23/083* (2013.01); *G01N 23/046* (2013.01); *G06T 7/0002* (2013.01);
(Continued)

(58) Field of Classification Search
CPC ............... G01N 23/083; G01N 23/046; G01N 2223/624; G01N 2223/419; G01N 2223/3306
See application file for complete search history.

(56) References Cited

U.S. PATENT DOCUMENTS
2018/0120242 A1   5/2018   Takahashi et al.
2021/0282734 A1*  9/2021   Kishi ................... A61B 90/06

FOREIGN PATENT DOCUMENTS
JP    2002-071345 A   3/2002
JP    2004-012407 A   1/2004

OTHER PUBLICATIONS

Müller, Pavel, et al. "Estimation of measurement uncertainties in X-ray computed tomography metrology using the substitution method." CIRP Journal of Manufacturing Science and Technology 7.3 (2014): 222-232.). (Year: 2014).*

(Continued)

*Primary Examiner* — Sean M Conner
*Assistant Examiner* — Han Hoang
(74) *Attorney, Agent, or Firm* — Greenblum & Bernstein, P.L.C.

(57) ABSTRACT

When measuring a mass-produced work piece using a measuring X-ray CT apparatus, which is configured to emit X-rays while rotating a work piece that is arranged on a rotary table and to reconstruct a projection image thereof to generate volume data of the work piece, the present invention assigns values to volume data for a predetermined work piece and stores the same as master data; obtains volume data for a mass-produced work piece under identical conditions to the predetermined work piece; measures the volume data and obtains an X-ray CT measured value for the mass-produced work piece; and corrects the X-ray CT measured value for the mass-produced work piece using the master data.

10 Claims, 11 Drawing Sheets

(51) Int. Cl.
G01N 23/046 (2018.01)
G06T 15/08 (2011.01)
G06T 7/00 (2017.01)

(52) U.S. Cl.
CPC ........ *G06T 15/08* (2013.01); *G01N 2223/419* (2013.01); *G01N 2223/624* (2013.01); *G06T 2207/10081* (2013.01); *G06T 2207/30164* (2013.01); *G06T 2207/30168* (2013.01)

(56) References Cited

OTHER PUBLICATIONS

Hiller, Jochen, et al. "Measurement uncertainty evaluation in dimensional X-ray computed tomography using the bootstrap method." International journal of precision engineering and manufacturing 15.4 (2014): 617-622. (Year: 2014).*

U.S. Appl. No. 16/299,513 to Kozo Ariga et al., which was filed Mar. 12, 2019.

U.S. Appl. No. 16/250,167 to Kozo Ariga et al., which was filed Jan. 17, 2019.

U.S. Appl. No. 16/291,674 to Sadayuki Matsumiya et al., which was filed Mar. 4, 2019.

U.S. Appl. No. 16/250,201 to Hidemitsu Asano et al., which was filed Jan. 17, 2019.

Villarraga-Gómez et al., "Dimensional metrology with X-ray CT: A comparison with CMM measurements on internal features and compliant structures," Precision Engineering 51 (2018):2 91-307, Aug. 2017.

Hiller et al., "Measurement Uncertainty Evaluation in Dimensional X-ray Computed Tomography Using the Bootstrap Method," International Journal of Precision Engineering and Manufacturing, vol. 15, No. 4, pp. 617-622, Apr. 2014.

* cited by examiner

Measured features:
outer diameter and inner diameter
of shaft portion

Fig. 9A
Fig. 9B
Cross section of measurement position
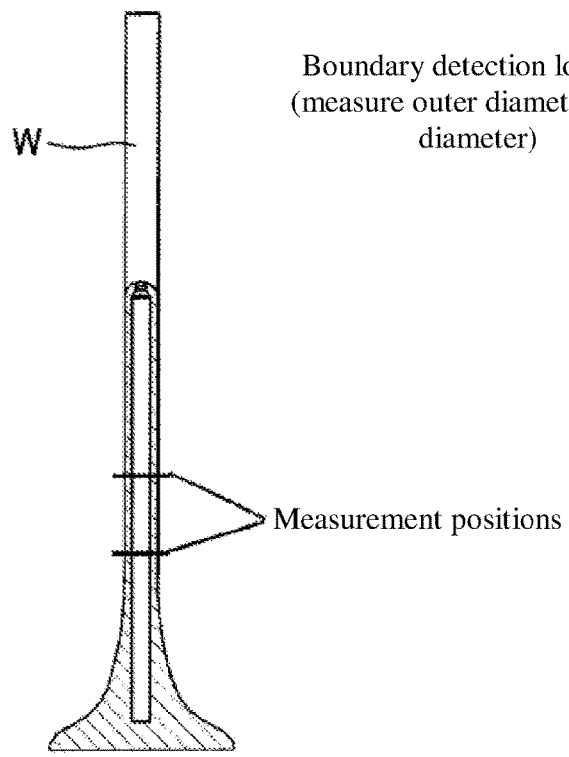
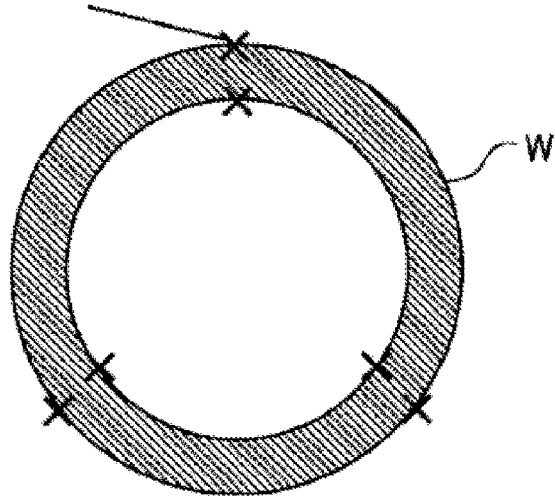
Boundary detection location (measure outer diameter/inner diameter)
Measurement positions Cut Measurement positions Cross section of measurement position CMM stylus head 72b
(measure outer diameter/inner diameter)

MEASURING X-RAY CT APPARATUS AND PRODUCTION WORK PIECE MEASUREMENT METHOD

CROSS-REFERENCE TO RELATED APPLICATIONS

The present application claims priority under 35 U.S.C. § 119 of Japanese Application No. 2018-044787, filed on Mar. 12, 2018, the disclosure of which is expressly incorporated by reference herein in its entirety.

BACKGROUND OF THE INVENTION

1. Field of the Invention

The present invention relates to a measuring X-ray CT apparatus and to a production work piece measurement method. In particular, the present invention relates to a measuring X-ray CT apparatus and to a (particularly mass-produced) production work piece measurement method that are capable of measuring volume data for a (mass-produced) production work piece with a high degree of accuracy.

2. Description of Related Art

Medical X-ray CT apparatuses were brought into practical use in the 1970s, and based on this technology, X-ray CT apparatuses for industrial products came out around the early 1980s. Since then, industrial X-ray CT apparatuses have been used for observation and inspection of pores in cast metal components, a welding issue of a welded component, a circuit pattern defect of an electronic circuit component, and the like, which are difficult to check from an external view. Meanwhile, along with a recent spread of 3D printers, demand is growing not only for the observation and the inspection of the interior of work pieces created by 3D printers, but also for 3D dimension measurements of an internal structure thereof and for accuracy in such measurements.

With respect to the above-mentioned trends in the technology, the measuring X-ray CT apparatus has begun spreading in areas centering on Germany (see Japanese Patent Laid-open Publication Nos. 2002-071345 A and 2004-012407 A). In the measuring X-ray CT apparatus, a measured object is placed at the center of a rotation table and X-ray irradiation is performed while rotating the measured object.

A configuration of a generic X-ray CT apparatus 1 which is used for measurement is shown in FIG. 1. The X-ray CT apparatus 1 is configured with an enclosure 10 which shields X-rays, a controller 20, a control PC 22, and the like. The enclosure 10 includes therein: an X-ray source 12 emitting X-rays 13 (shaped in a cone beam), an X-ray detection device 14 detecting the X-rays 13, a rotary table 16 on which a work piece W is placed and which rotates the work piece W for CT imaging, and an XYZ displacement mechanism 18 adjusting a position or magnification ratio of the work piece W which is projected onto the X-ray detection device 14. The controller 20 controls the devices mentioned above, and the control PC 22 issues instructions from a user operation to the controller 20.

In addition to controlling each device, the control PC 22 includes a function to display a projection image of the work piece W which is projected onto the X-ray detection device 14, and a function to reconstruct a tomographic image from a plurality of projection images of the work piece W.

As shown in FIG. 2, the X-rays 13 emitted, or fired, from the X-ray source 12 reach the X-ray detection device 14 by passing through the work piece W on the rotary table 16. The tomographic image of the work piece W is generated by obtaining, with the X-ray detection device 14, transmission images (projection images) of the work piece W in various directions while rotating the work piece W and by reconstructing the images using a reconstruction algorithm, such as a back projection method, a successive approximation method, and the like.

By controlling XYZ axes of the XYZ displacement mechanism 18 and a θ axis of the rotary table 16, the position of the work piece W can be shifted and an image capture range (position, magnification ratio) or an image capture angle of the work piece W can be adjusted.

In order to acquire a tomographic image or volume data (stereoscopic image or aggregation of tomographic images in the Z axis direction) of the work piece W, which is the ultimate objective of the X-ray CT apparatus 1, a CT scan of the work piece W is performed.

A CT scan is composed of two processes: acquiring a projection image of the work piece W and CT reconstruction. In the projection image acquisition process, the rotary table 16 on which the work piece W rests during X-ray irradiation is rotated continuously at a fixed speed or intermittently by fixed step widths, and a projection image of the work piece W is acquired in the entire circumferential direction (a fixed interval). The resulting projection image for the entire circumferential direction (fixed interval) undergoes CT reconstruction using a CT reconstruction algorithm such as a back projection method or a successive approximation method, thereby obtaining, as exemplified in FIG. 3, a tomographic image or volume data for the work piece (master balls in FIG. 3).

Using the resulting volume data, various kinds of measurements can be performed, such as dimension measurement, defect analysis, or the like.

Various measurements of an interior of the work piece (dimension measurement, defect analysis, or the like) can be performed using the generated volume data, but such measurements may include various unreliable measurements arising from the conditions of each (work piece material, transmission length, or the like) or error factors. Complex correlations exist between the various conditions or error factors and the unreliability of the measurement, and establishing clear conditions for a work piece composed of a plurality of materials and having a complex structure is difficult, while correcting various measurement errors with a high degree of accuracy is extremely problematic.

Sources of unreliability in the measurement may include, for example: (1) hardware causes such as the X-ray source (spectrum, focus characteristics, stability) and X-ray detection device (stability/thermal drift, dynamic characteristics, scattering, contrast sensitivity, pixel variation, noise, lateral resolution, machine axis (geometric error, mechanical stability)); (2) software/data processing causes such as 3D reconstruction, determining a threshold value, data thinning (surface), and data correction (scale errors); (3) measured object (work piece) causes such as surface roughness, transmission length (attenuation), dimensions and structure, material composition, beam hardening, and scattering radiation; (4) operator settings causes such as advance processing, X-ray source electric current, acceleration voltage, amplification, orientation of the measured object, field of view number, spatial resolution (radiation source, relative distance between the measured object and the X-ray detection device), and amount of X-ray detection device exposure time; and (5) environmental causes such as temperature, vibration, and humidity.

SUMMARY OF THE INVENTION

The present invention has been conceived in light of the conventional circumstances above, and is configured such that, for example, by using volume data for a given mass-produced work piece as master data, measured values for other mass-produced work pieces can be corrected and measurement of volume data can be performed with a high degree of accuracy.

Unreliability of an X-ray CT measurement is greatly affected by the material and transmission length of a work piece, and is significant as compared to the unreliability of a measurement made by a highly accurate measuring device such as a three-dimensional (coordinate) measurement machine (CMM), for example. Meanwhile, when comparing identical shapes/materials, X-ray CT measurements exhibit little difference in unreliability in such cases (because the materials and transmission lengths of the work pieces are the same).

For example, when performing a dimension measurement of a work piece composed of materials A and B, as illustrated in FIG. 4, using both a CMM and X-ray CT, the X-ray CT measured value (dimension) has a larger degree of measurement unreliability compared to the CMM measured value, and the measurement unreliability changes depending on the material. However, when using a single mass-produced work piece as a reference work piece, for example, and measuring the reference work piece and another of the mass-produced work pieces using X-ray CT, because the materials and shapes are identical, the two have an equivalent degree of measurement unreliability.

When an amount of difference between the CMM measured value and the X-ray CT measured value is expressed as $\Delta\alpha$ and an amount of difference between measured values for the reference work piece and the mass-produced work piece is expressed as $\Delta\beta$, each respectively includes an error such as the following.

$\Delta\alpha$ . . . Error arising from the shape or material in the X-ray CT measurement $\Delta\beta$ . . . Individual differences in work piece shape By using $\Delta\alpha$ and $\Delta\beta$ as the master data for the X-ray CT measured value for the mass-produced work piece, the mass-produced work piece can be corrected to an equivalent degree to the CMM measured value.

The present invention has been conceived in light of this information.

The present invention addresses this challenge by equipping a measuring X-ray CT apparatus, which is configured to emit X-rays while rotating a work piece that is arranged on a rotary table and to reconstruct a projection image thereof to generate volume data of the work piece, with: a memory storing as master data volume data for a predetermined work piece, for which values are assigned ahead of time; a mechanism obtaining volume data for a mass-produced work piece under identical conditions to the predetermined work piece; a mechanism measuring the volume data and obtaining an X-ray CT measured value for the mass-produced work piece; and a corrector correcting the X-ray CT measured value for the mass-produced work piece using the master data.

Here, the predetermined work piece can be one of the mass-produced work pieces.

The present invention similarly addresses the challenge noted above by, when measuring a mass-produced work piece using a measuring X-ray CT apparatus, which is configured to emit X-rays while rotating a work piece that is arranged on a rotary table and to reconstruct a projection image thereof to generate volume data of the work piece: assigning values to volume data for a predetermined work piece and storing the same as master data; obtaining volume data for a mass-produced work piece under identical conditions to the predetermined work piece; measuring the volume data and obtaining an X-ray CT measured value for the mass-produced work piece; and correcting the X-ray CT measured value for the mass-produced work piece using the master data.

According to the present invention, in measuring a mass-produced work piece with X-ray CT, values are assigned to volume data that includes various errors for a specific mass-produced work piece, this is taken as master data, and volume data for each mass-produced work piece is corrected collectively without considering various error factors, and thereby the measured value for each mass-produced work piece can be corrected with a high degree of accuracy. For example, when a CMM is used to assign values to the master data, a measured value having an equivalently high degree of accuracy to the CMM can be obtained.

Also, the present invention can be applied simply even for a work piece composed of a plurality of materials, for which X-ray CT is generally not particularly successful.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 9A and 9B illustrate measurement positions on the work piece in the embodiment;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described in detail with reference to the drawings. Moreover, the present invention is not limited by the content described in the embodiment and examples that follow. Additionally, elements easily conceivable to a person skilled in the art and elements that are intrinsic equivalents or otherwise equal in scope are included within the compositional requirements of the examples and the embodiment below. Furthermore, the disclosed compositional requirements within the written embodiment and examples below may be combined or selectively employed as appropriate.

Figure 5:
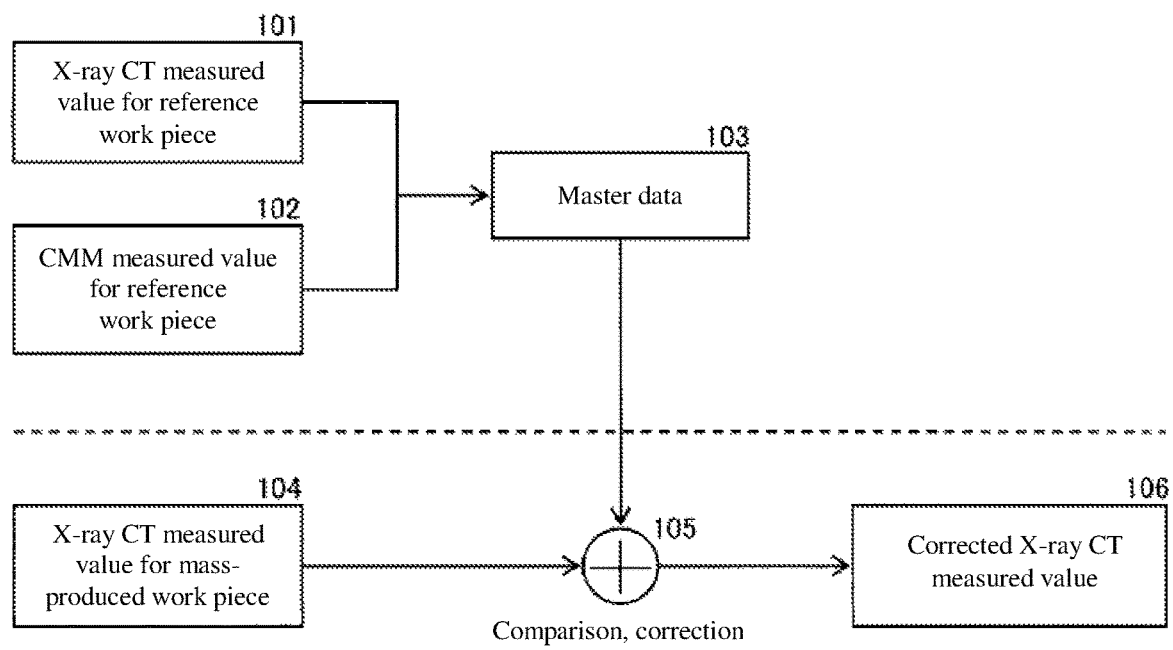
FIG. 5 illustrates a procedural flow in an embodiment of the present invention.

FIG. 5 illustrates a procedural flow in an embodiment of the present invention.

Figure 6:
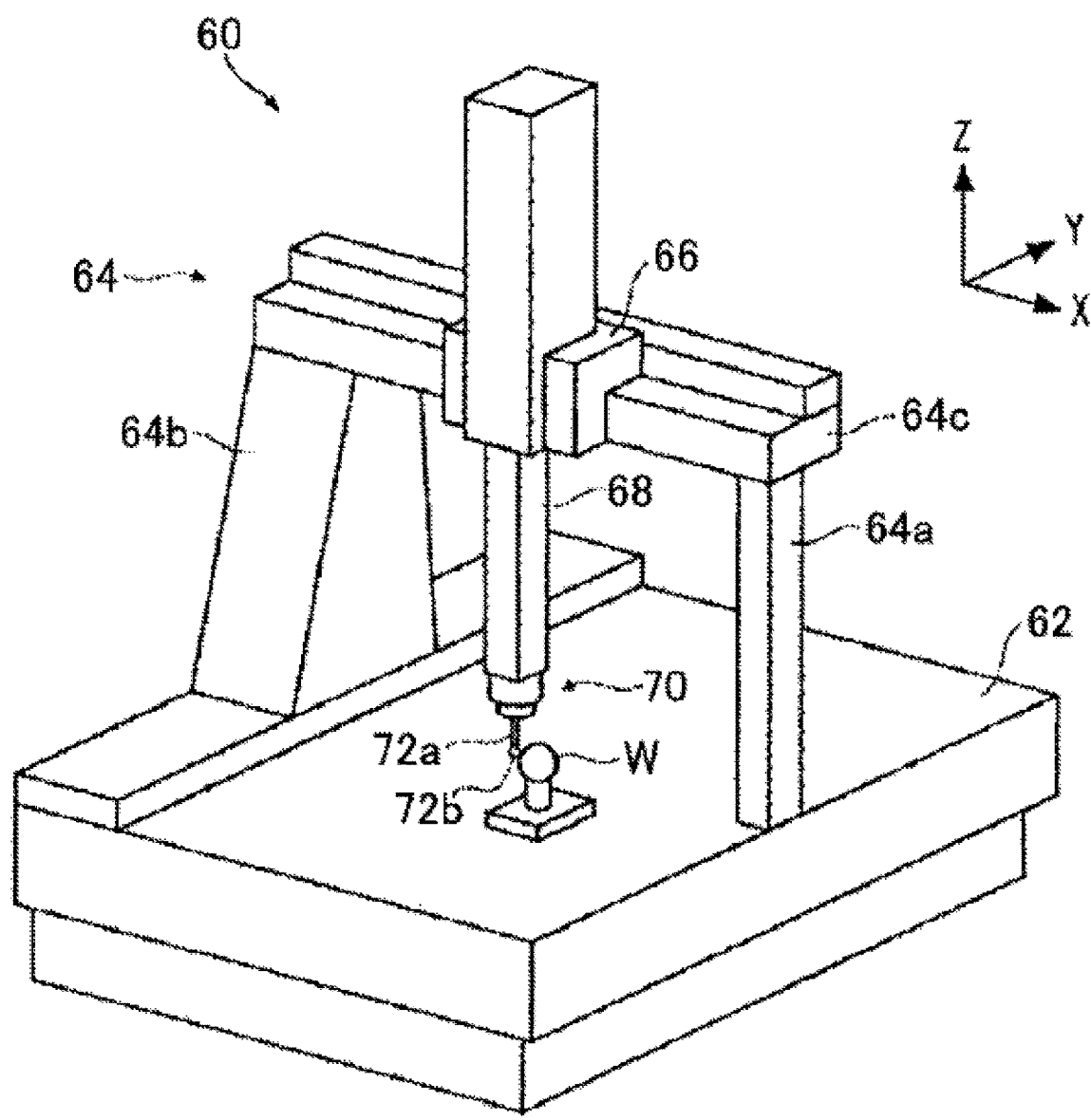
FIG. 6 is a perspective view showing an exemplary CMM used in assigning values to master data in the embodiment.

An X-ray CT measured value of a reference work piece is found in step 101, and in addition, using a three-dimensional (coordinate) measurement machine (CMM) 60 such as exemplified in FIG. 6, a CMM measured value of the reference work piece is found in step 102, and master data is found in step 103 using these measured values.

The CMM 60 includes a surface plate 62 (reference plane); a portal frame 64 having a pair of columns 64a and 64b which are movable on the surface plate 62 in a front-back direction (Y axis direction) and a beam 64c bridging over the columns 64a and 64b; a movable column 66 which moves on the beam 64c of the portal frame 64 in a left-right direction (X axis direction); a movable slider 68 which moves on the column 66 in an up-down direction (Z axis direction); a probe 70 fixated to a bottom end of the slider 68; and a stylus 72a and, for example, a spherical stylus head 72b which are fixated to a tip (lower end in the drawing) of the probe 70.

Meanwhile, an X-ray CT measured value of a mass-produced work piece is found in step 104, which is compared with master data 103 and corrected in step 105, and thereby a corrected X-ray CT measured value can be obtained in step 106.

Accordingly, a measured value having an equivalently high degree of accuracy to the CMM measured value can be obtained without conducting a CMM measurement of the mass-produced work piece.

The master data and the measured values for calculating the master data may be dimensions of a predetermined portion of the work piece or may be coordinate values identifying any desired standard reference.

An error in the X-ray CT measured value that is dependent on a specific work piece material or shape can also be offset through the principles of the present invention, which makes use of a comparison, and correction similar to that of a work piece of a single material is possible even for a work piece composed of a plurality of materials, for example, for which X-ray CT is not particularly successful.

This is described in detail below.

Figure 7:
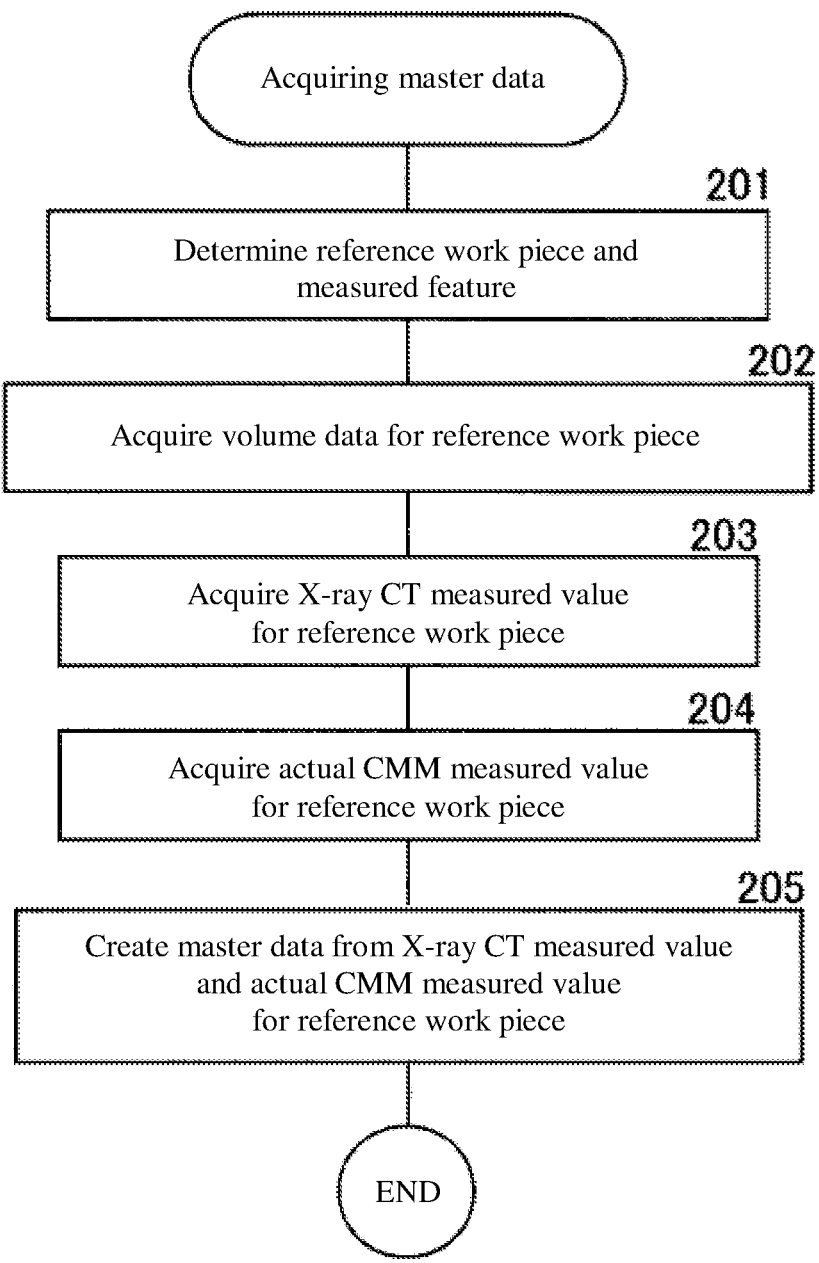
FIG. 7 is a flow chart illustrating a procedural flow up to acquiring the master data in the embodiment.

A procedure up to obtaining the master data in step 103 is as illustrated in FIG. 7.

Figure 8A:
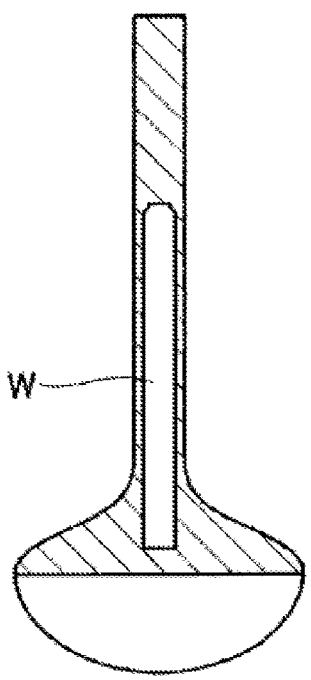
FIGS. 8A and 8B illustrate an exemplary work piece and measured feature in the embodiment.
Figure 8B:
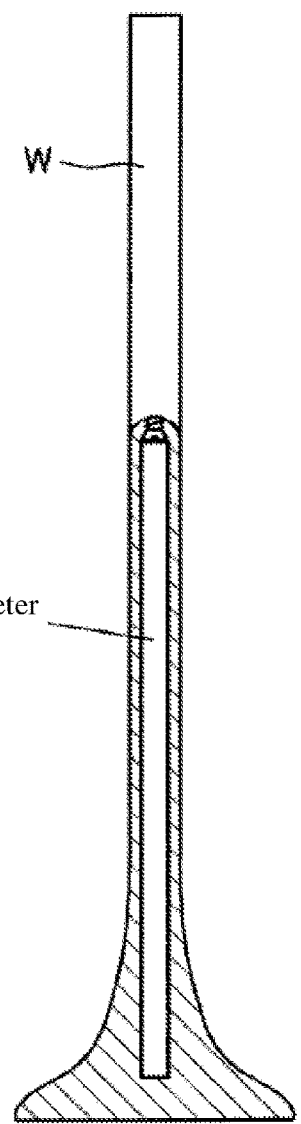

First, in step 201, a work piece (reference work piece) serving as a standard reference is selected from among the mass-produced work pieces and a measured feature is decided. For example, in the case of a cast metal component having a hollow space on an interior thereof (in this example, a hollow valve of an automobile engine) as illustrated in FIG. 8A, an outer diameter and inner diameter (diameter of the hollow portion) of a shaft portion of the work piece as illustrated in FIG. 8B are selected as the measured features.

Next, the process advances to step 202, where the reference work piece undergoes a CT scan and volume data for the reference work piece is obtained.

In this example, the CT scan is performed so as to include the measured feature or a reference location needed for coordinate alignment or the like in order to measure the measured feature, and volume data for the reference work piece is generated. Also, CT scan conditions at this time (X-ray settings, X-ray detection device settings, scan range, and the like) are needed for the CT scan of the mass-produced work piece and are therefore stored for later use.

Next, the process advances to step 203, where the volume data is measured and the X-ray CT measured value of the reference work piece is obtained (step 101 in FIG. 5).

For example, two locations in the axis direction of the hollow valve are designated as measurement positions, and a boundary detection (detecting a boundary between empty space and a material) of the outer diameter and inner diameter of the shaft portion is performed on a cross section of the same measurement positions in the acquired volume data.

On the basis of a set of boundary detection points measured as described above, a best-fit cylinder is created for the outer diameter and the inner diameter, respectively, as illustrated in FIGS. 9A and 9B, and the diameters of the respective cylinders are calculated. Here, the outer diameter is labeled $R_{xo}$ and the inner diameter is labeled $R_{xi}$.

Next, the process advances to step 204, where an outer/inner shape of the reference work piece is measured with the CMM 60 illustrated in FIG. 6 and an actual CMM measurement value for the reference work piece is obtained (step 102 in FIG. 5).

When measuring the inner shape, the reference work piece may be disassembled/broken and the inner shape measured for each piece.

Figure 10A:
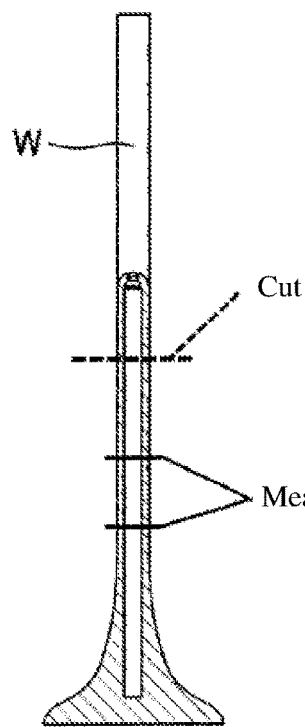
FIGS. 10A and 10B illustrate measurement positions for the CMM in the embodiment.
Figure 10B:
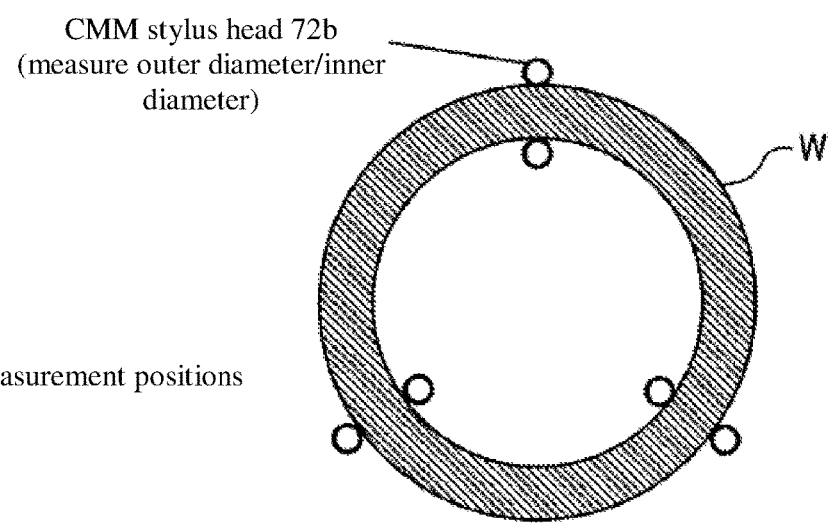

For example, as illustrated in FIGS. 10A and 10B, the shaft portion of the hollow valve is cut and a CMM measurement is taken of the cross section thereof using the stylus head 72b of the CMM 60. The measurement positions are set to the same positions (two locations) as during the X-ray CT measurement and the outer diameter and inner diameter of the shaft portion are measured for each measurement position (cross section).

On the basis of a set of measurement points measured as described above (for which stylus head diameter correction is complete), a best-fit cylinder is created for the outer diameter and the inner diameter, respectively, and the diameters of the respective cylinders are calculated. Here, the outer diameter is labeled $R_{co}$ and the inner diameter is labeled $R_{ci}$.

Next, the process advances to step 205, where the master data is created from the X-ray CT measured value for the reference work piece and the actual CMM measured value for the reference work piece (step 103 in FIG. 5).

For example, here, differences $\Delta R_o$ and $\Delta R_i$ between the outer diameters $R_{xo}$ and $R_{co}$ and the inner diameters $R_{xi}$ and $R_{ci}$, respectively, which are calculated from the X-ray CT measured values and the actual CMM measured values, are set as the master data.

$$\Delta R_o = R_{co} - R_{xo} \tag{1}$$

$$\Delta R_i = R_{ci} - R_{xi} \tag{2}$$

Figure 11:
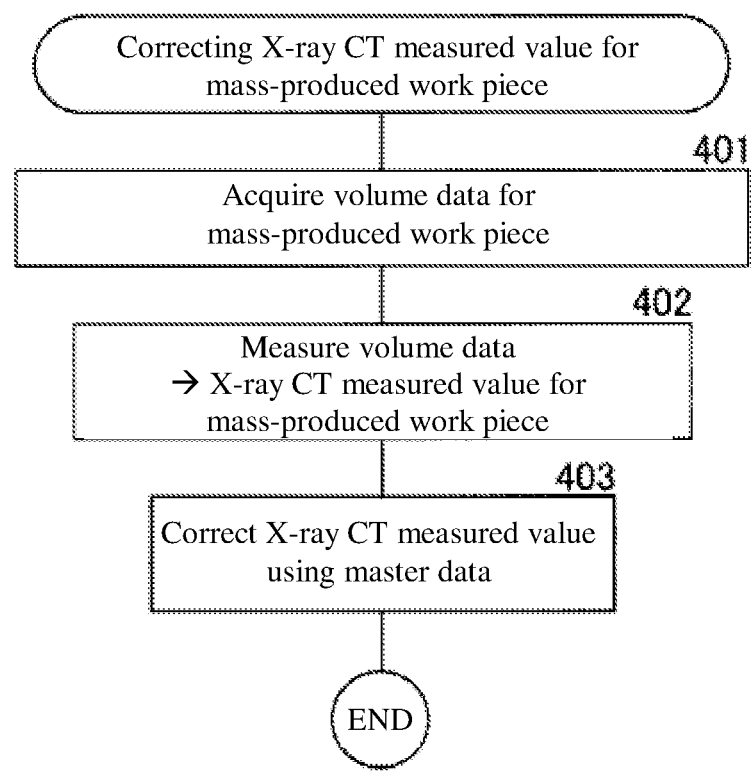
FIG. 11 is a flow chart illustrating a procedure for correcting an X-ray CT measured value of a mass-produced work piece in the embodiment.

Using the master data obtained in FIG. 7, the X-ray CT measured value for the mass-produced work piece is corrected as illustrated in FIG. 11.

First, in step 401, the mass-produced work piece undergoes a CT scan under the same conditions as the reference work piece, and volume data for the mass-produced work piece is obtained.

Next, the process advances to step 402, where the volume data is measured and the X-ray CT measured value for the mass-produced work piece is obtained (step 104 in FIG. 5).

Specifically, the same measurement positions as the volume data for the reference work piece are measured using the same method, and the cylinder diameters for the outer diameter and inner diameter are calculated. Here, the outer diameter is labeled $R_{wo}$ and the inner diameter is labeled $R_{wi}$.

Next, the process advances to step 403, where corrected X-ray CT measured values are obtained using the master data $\Delta R_o$ and $\Delta R_i$ (step 106 in FIG. 5).

Specifically, when the outer diameter is labeled $R'_{wo}$ and the inner diameter is labeled $R'_{wi}$, where the outer diameter $R'_{wo}$ and inner diameter $R'_{wi}$ are corrected X-ray CT measured values, calculation formulas for these values may be expressed as follows.

$$R'_{wo}=R_{wo}+\Delta R_o \qquad (3)$$

$$R'_{wi}=R_{wi}+\Delta R_i \qquad (4)$$

In the embodiment described above, one mass-produced work piece is treated as the reference work piece, and therefore there is no need to specially manufacture a reference work piece. A reference work piece can also be manufactured separately from the mass-produced work pieces, specially for acquiring master data.

A mechanism for assigning values to the master data is not limited to a coordinate measuring machine.

Also, the measured object is not limited to a hollow engine valve.

Figure 1:
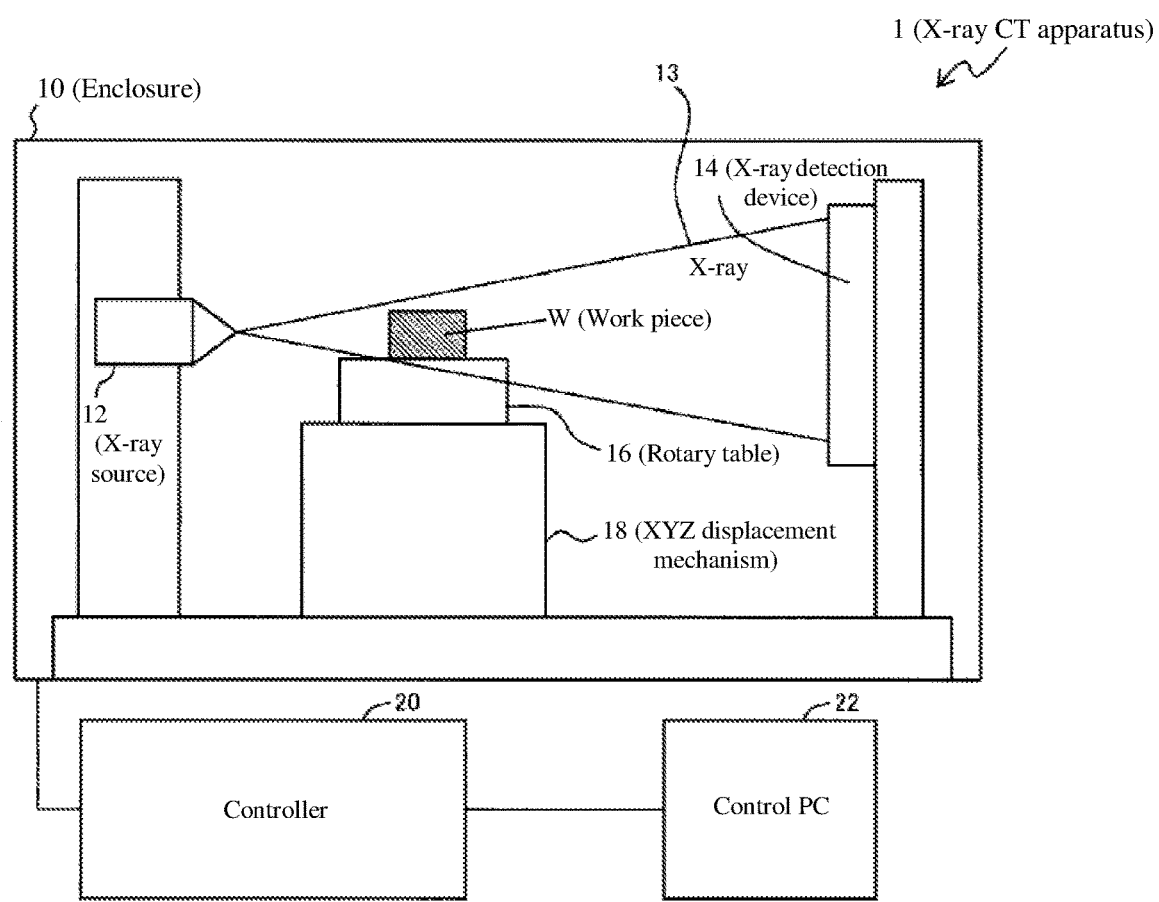
FIG. 1 illustrates a cross section of an overall configuration of a generic X-ray CT apparatus used for measurement.
Figure 2:
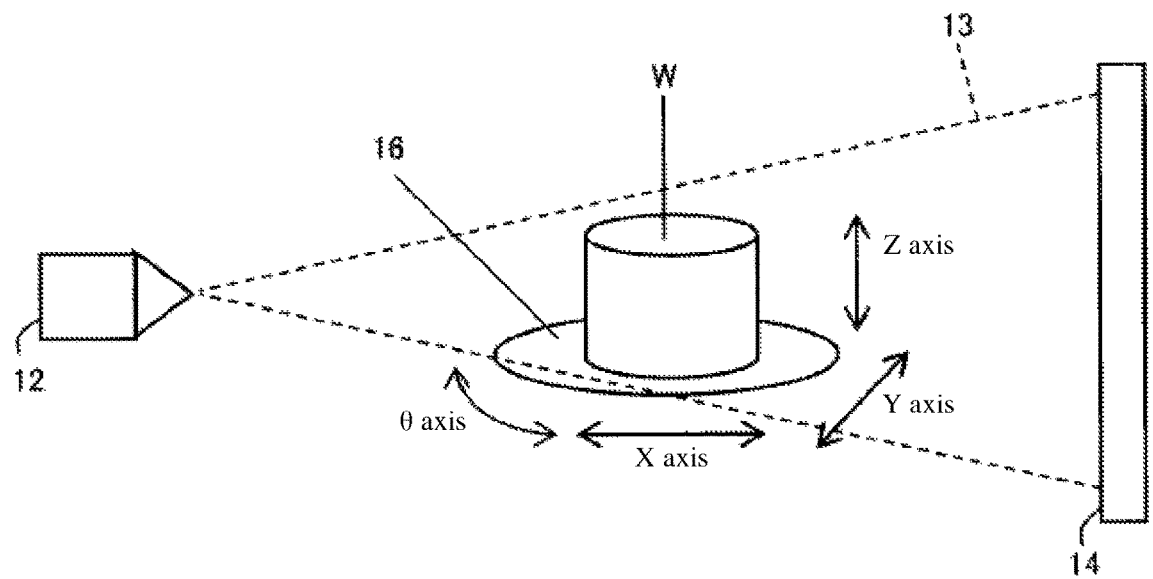
FIG. 2 illustrates a perspective view showing an arrangement of a main portion of the generic X-ray CT apparatus used for measurement.
Figure 3:
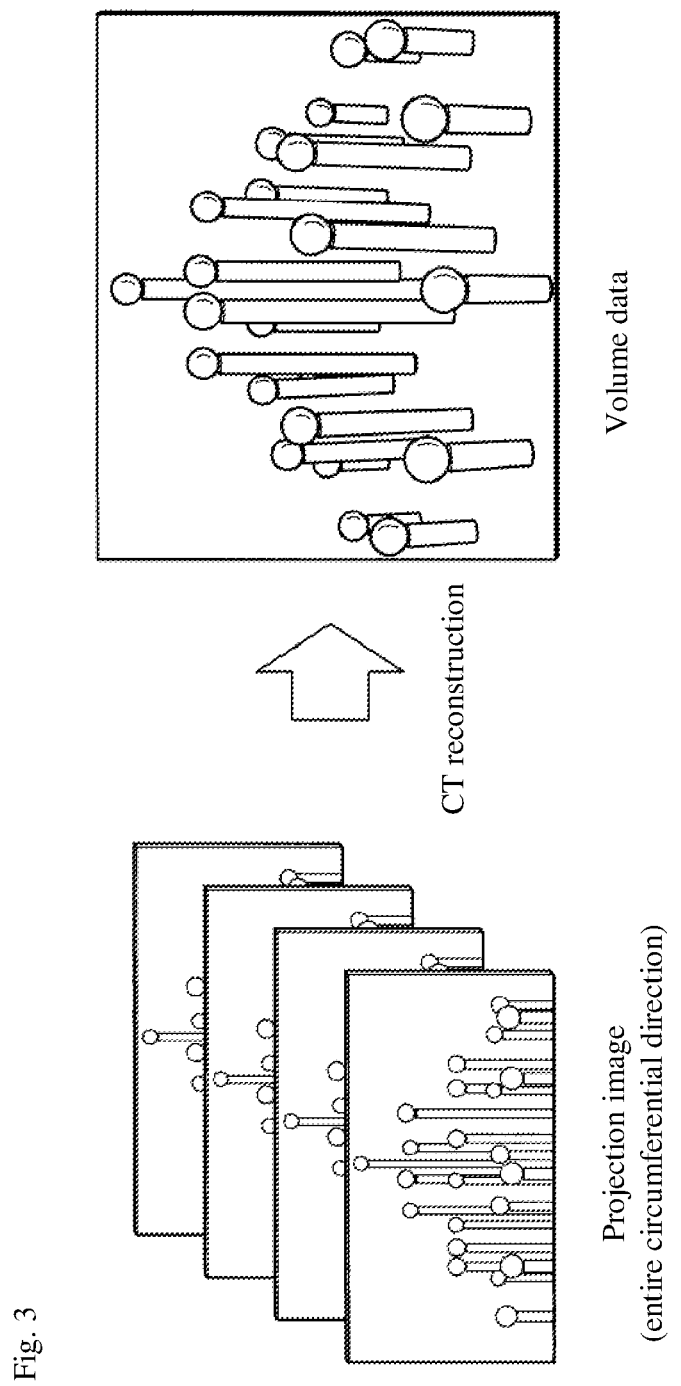
FIG. 3 illustrates an overview of CT reconstruction.
Figure 4:
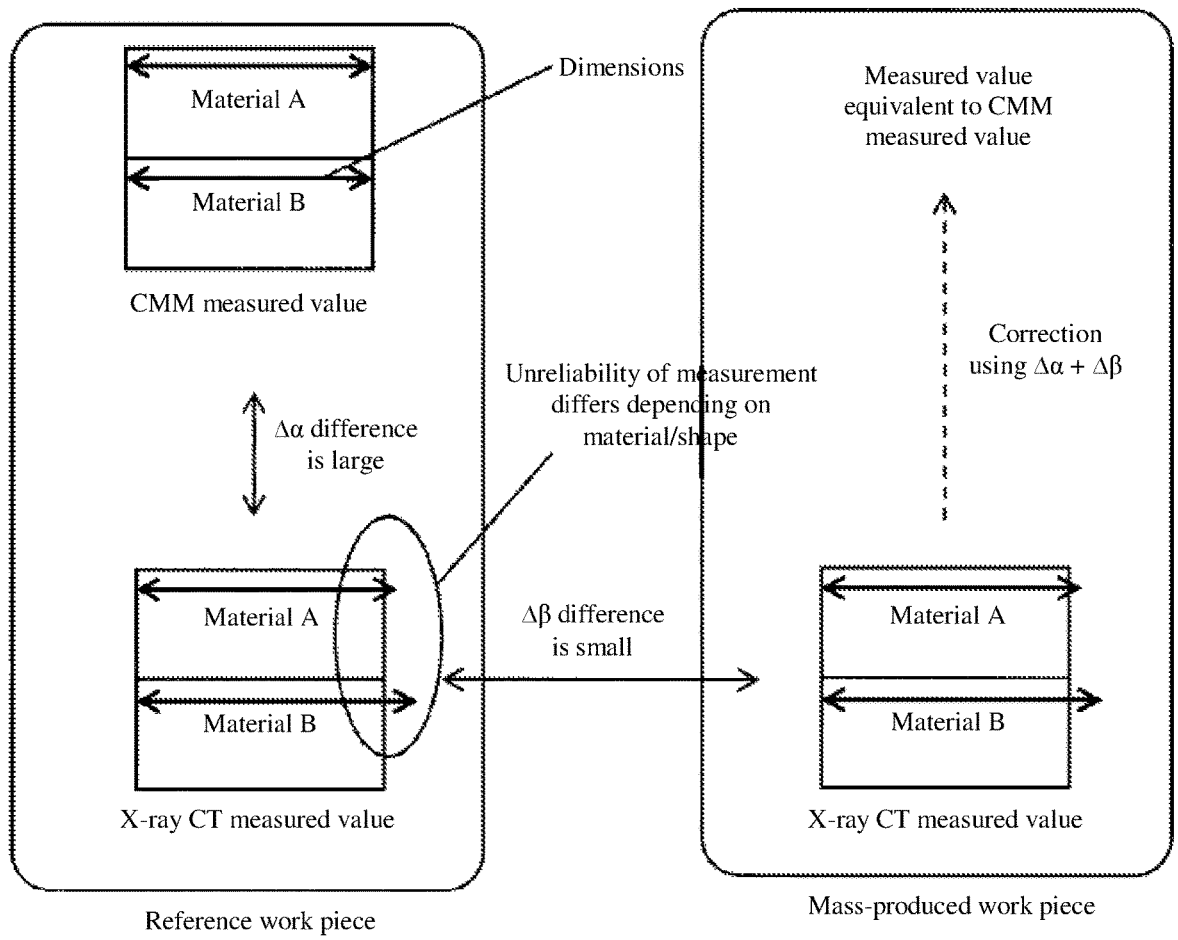
FIG. 4 illustrates principles of the present invention.

As illustrated in FIG. 1, the control PC 22 may include at least one processor. The processor is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor is an article of manufacture and/or a machine component. The processor is configured to execute software instructions in order to perform functions as described in the various embodiments herein. For example, the processor is configured to execute instructions such that the processor operates as a system that obtains volume data for a mass-produced work piece under identical conditions to the predetermined work piece, a system that measures the volume data and that obtains an X-ray CT measured value for the mass-produced work piece, and a corrector that corrects the X-ray CT measured value for the mass-produced work piece using the master data.

The processor may be a general purpose processor or may be part of an application specific integrated circuit (ASIC). The processor may also be a microprocessor, a microcomputer, a processor chip, a controller, a microcontroller, a digital signal processor (DSP), a state machine, or a programmable logic device. The processor may also be a logical circuit, including a programmable gate array (PGA) such as a field programmable gate array (FPGA), or another type of circuit that includes discrete gate and/or transistor logic. The processor may be a central processing unit (CPU), a graphics processing unit (GPU), or both. Additionally, any processor described herein may include multiple processors, parallel processors, or both. Multiple processors may be included in, or coupled to, a single device or multiple devices.

The control PC 22 may also include one or more computer memories. The computer memory may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory may include any combination of memories or a single storage.

The control PC 22 may also include a medium reader which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory, the medium reader, and/or the processor during execution by the control PC 22.

The control PC 22 is shown in FIG. 1 as a personal computer. However, those skilled in the art appreciate that, in alternative embodiments of the present application, the control PC 22 may be a laptop computer, a tablet PC, a personal digital assistant, a mobile device, a palmtop computer, a desktop computer, a communications device, a wireless telephone, a personal trusted device, a web appliance, a server, a security camera, or any other device that is capable of executing a set of instructions, sequential or otherwise, that specify actions to be taken by that device. Of course, those skilled in the art appreciate that the above-listed devices are merely exemplary devices and that the control PC 22 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the control PC 22 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limiting embodiment, implementations can include distributed processing, component/object distributed processing, and parallel processing. Virtual computer system processing can be constructed to implement one or more of the methods or functionality as described herein, and a processor described herein may be used to support a virtual processing environment.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measuring X-ray CT apparatus that is configured to emit X-rays while rotating a work piece that is arranged on a rotary table and to reconstruct a projection image thereof to generate volume data of the work piece, the measuring X-ray CT apparatus comprising:
   one or more memories that store:
      a set of executable instructions, and
      volume data for a predetermined work piece as master data, for which values are assigned ahead of time, wherein the predetermined workpiece is a hollow cylindrical workpiece and the master data includes $\Delta R_o$ and $\Delta R_i$, which are calculated using the following master data formulas:

$$\Delta R_o = R_{co} - R_{xo} \qquad (1)$$

$$\Delta R_i = R_{ci} - R_{xi} \qquad (2)$$

wherein $R_{co}$ is an actual coordinate measuring machine measured value of an outer diameter of the predetermined workpiece, $R_{xo}$ is an X-ray CT measured value of the outer diameter of the predetermined workpiece, $R_{ci}$ is an actual coordinate measuring machine measured value of an inner diameter of the predetermined workpiece, and $R_{xi}$ is an X-ray CT measured value of the inner diameter of the predetermined workpiece; and
   a processor, which when executing the set of executable instructions, is configured to operate as:
      a system that obtains volume data for a production work piece under identical conditions to the predetermined work piece;
      a system that measures the volume data for the production work piece and that obtains $R_{wo}$, which is an X-ray CT measured value of the outer diameter of the production work piece, and $R_{wi}$ which is an X-ray CT measured value of the inner diameter of the production work piece; and
      a corrector that corrects the X-ray CT measured value for the production work piece in accordance with the following:

$$R'_{wo} = R_{wo} + \Delta R_o \qquad (3)$$

$$R'_{wi} = R_{wi} + \Delta R_i \qquad (4)$$

$$\Delta \alpha > \Delta \beta \qquad (5)$$

$$\Delta \alpha + \Delta B \qquad (6)$$

wherein $R'_{wo}$ is a corrected X-ray CT measured value for an outer diameter of the production workpiece and $R'_{wi}$ is a corrected X-ray CT measured value for an inner diameter of the production workpiece, and
   wherein $\Delta \alpha$ is a difference between the coordinate measuring machine measured values of the predetermined workpiece and the X-ray CT measured values of the predetermined workpiece, and $\Delta \beta$ is a difference between the X-ray CT measured values of the predetermined workpiece and the X-ray CT measured values of the production work piece.

2. The measuring X-ray CT apparatus according to claim 1, wherein:
   the production work piece includes a plurality of production work pieces, and
   the predetermined work piece is a mass-produced work piece selected from the plurality of production work pieces.

3. A work piece measurement method of a measuring X-ray CT apparatus which, when measuring a production work piece, emits X-rays while rotating a work piece that is arranged on a rotary table, and reconstructs a projection image thereof to generate volume data of the work piece, the method comprising:
   assigning values to volume data for a predetermined work piece, and storing the volume data as master data, wherein the predetermined workpiece is a hollow cylindrical workpiece and the master data includes $\Delta R_o$ and $\Delta R_i$, which are calculated using the following master data formulas:

$$\Delta R_o = R_{co} - R_{xo} \qquad (1)$$

$$\Delta R_i = R_{ci} - R_{xi} \qquad (2)$$

wherein $R_{co}$ is an actual coordinate measuring machine measured value of an outer diameter of the predetermined workpiece, $R_{xo}$ is an X-ray CT measured value of the outer diameter of the predetermined workpiece, $R_{ci}$ is an actual coordinate measuring machine measured value of an inner diameter of the predetermined workpiece, and $R_{xi}$ is an X-ray CT measured value of the inner diameter of the predetermined workpiece;
   obtaining volume data for a production work piece under identical conditions to the predetermined work piece;
   measuring the volume data for the production work piece and obtaining $R_{wo}$, which is an X-ray CT measured value of the outer diameter of the production work piece, and $R_{wi}$, which is an X-ray CT measured value of the inner diameter of the production work piece; and
   correcting the X-ray CT measured value for the production work piece, in accordance with the following:

$$R'_{wo} = R_{wo} + \Delta R_o \qquad (3)$$

$$R'_{wi} = R_{wi} + \Delta R_i \qquad (4)$$

$$\Delta \alpha > \Delta \beta \qquad (5)$$

$$\Delta \alpha + \Delta B \qquad (6)$$

wherein $R'_{wo}$ is a corrected X-ray CT measured value for an outer diameter of the production workpiece and $R'_{wi}$ is a corrected X-ray CT measured value for an inner diameter of the production workpiece, and wherein $\Delta\alpha$ is a difference between the coordinate measuring machine measured values of the predetermined workpiece and the X-ray CT measured values of the predetermined workpiece, and $\Delta\beta$ is a difference between the X-ray CT measured values of the predetermined workpiece and the X-ray CT measured values of the production work piece.

4. The work piece measurement method according to claim 3, wherein:
the production work piece includes a plurality of production work pieces, and
the predetermined work piece is a mass-produced work piece selected from the plurality of production work pieces.

5. The measuring X-ray CT apparatus according to claim 1, wherein:
$\Delta\alpha$ relates to an error arising from a shape or a material of the predetermined workpiece.

6. The work piece measurement method according to claim 3, wherein:
$\Delta\alpha$ relates to an error arising from a shape or a material of the predetermined workpiece.

7. The measuring X-ray CT apparatus according to claim 1, wherein:
$\Delta\beta$ relates to a difference between a shape of the predetermined workpiece and a shape of the production work piece.

8. The work piece measurement method according to claim 3, wherein:
$\Delta\beta$ relates to a difference between a shape of the predetermined workpiece and a shape of the production work piece.

9. The measuring X-ray CT apparatus according to claim 1, wherein:
the predetermined workpiece comprises a first material and a second material, the first material and the second material having the same dimensions and different X-ray CT measured values.

10. The work piece measurement method according to claim 3, wherein:
the predetermined workpiece comprises a first material and a second material, the first material and the second material having the same dimensions and different X-ray CT measured values.

* * * * *